United States Patent
Sai et al.

(10) Patent No.: US 10,408,650 B2
(45) Date of Patent: Sep. 10, 2019

(54) ULTRASONIC METER TRANSDUCER

(71) Applicant: Honeywell International Inc., Morris Plains, NJ (US)

(72) Inventors: Bin Sai, The Hague (NL); Fabian Weber, Mainz-Kastel (DE)

(73) Assignee: Honeywell International Inc., Morris Plains, NJ (US)

( * ) Notice: Subject to any disclaimer, the term of this patent is extended or adjusted under 35 U.S.C. 154(b) by 118 days.

(21) Appl. No.: 15/694,014

(22) Filed: Sep. 1, 2017

(65) Prior Publication Data
US 2019/0072422 A1    Mar. 7, 2019

(51) Int. Cl.
*G01F 1/66* (2006.01)
*F16J 15/06* (2006.01)
*F16J 15/10* (2006.01)

(52) U.S. Cl.
CPC ............ *G01F 1/667* (2013.01); *F16J 15/061* (2013.01); *F16J 15/064* (2013.01); *F16J 15/102* (2013.01); *F16J 15/104* (2013.01); *G01F 1/662* (2013.01)

(58) Field of Classification Search
CPC .. G01F 1/66; G01F 15/18; A61C 17/20; F16J 15/12; F02F 11/00
See application file for complete search history.

(56) References Cited

U.S. PATENT DOCUMENTS

| | | | |
|---|---|---|---|
| 3,427,481 A | | 2/1969 | Lenahan et al. |
| 3,558,144 A | * | 1/1971 | Corbett .................. F16L 21/025 |
| | | | 277/604 |
| 3,771,117 A | | 11/1973 | Shaffer et al. |
| 3,779,565 A | * | 12/1973 | Witte .................... B02C 18/302 |
| | | | 277/654 |
| 4,297,607 A | | 10/1981 | Lynnworth et al. |
| 4,596,133 A | | 6/1986 | Smalling et al. |
| 4,911,018 A | * | 3/1990 | Hartman ................. G01F 1/588 |
| | | | 73/272 R |
| 5,066,023 A | * | 11/1991 | Ma ........................ F02B 77/085 |
| | | | 277/317 |
| 5,076,592 A | * | 12/1991 | Pearlstein .............. F02F 11/002 |
| | | | 277/593 |
| 5,106,107 A | * | 4/1992 | Justus .................... F16J 15/123 |
| | | | 277/601 |
| 5,460,047 A | | 10/1995 | Jacobson |
| 6,799,475 B2 | | 10/2004 | van Klooster |
| 8,961,176 B2 | * | 2/2015 | Paschke ................... A61C 1/07 |
| | | | 433/119 |
| 9,429,465 B2 | | 8/2016 | van Klooster et al. |

\* cited by examiner

*Primary Examiner* — Jewel V Dowtin

(57) ABSTRACT

A system, method, and apparatus for attenuating acoustic back-coupling in a ultrasonic meter transducer that includes a gasket band comprising a loop of a material, a first gasket ring integrated in the gasket band configured to match a diameter of a first bracket hole, and a second gasket ring integrated in the gasket band configured to match a diameter of a second bracket hole wherein the loop of material comprises a material that provides both environmental sealing and acoustic attenuation.

18 Claims, 8 Drawing Sheets

ULTRASONIC METER TRANSDUCER

TECHNICAL FIELD

The present embodiments are generally related to gas distribution systems. The embodiments are related to methods and systems for ultrasonic meters. The embodiments are additionally related to methods and systems for ultrasonic meter transducers. More specifically, the embodiments are related to methods and systems for preventing rust and preventing signal back-coupling of ultrasonic meter transducers mounted on steel pipes.

BACKGROUND

Ultrasonic meters (USM) have become increasingly popular for fiscal flow metering worldwide. Ultrasonic meters are desirable because they can measure a wide range of flow rates with excellent accuracy, they have less impact on pressure drops, and they have no moving parts.

One element of a USM is an ultrasonic transducer, which transmits ultrasonic signals to and receives ultrasonic signals traveling through substances flowing in a pipe (or spool). Such pipes are usually made of steel. As a result, the joint interface between the pipe and transducer mounting holding the bracket is vulnerable to rust. To avoid rust, a common rubber gasket can be used. However, common rubber gaskets cause signal back-coupling especially in low pressure applications. Unwanted back-coupling resulting from the acoustic vibration and/or oscillation of the mounting bracket and/or of meter body as well as from the returned signals from backward propagation through bracket and meter body deteriorate signal quality and obscure signal detection, causing unstable performance of the meter.

To avoid such undesirable back-coupling, a small air gap between the meter body and holding bracket can be used to insulate the ultrasounds. But the air gap is vulnerable to moisture and temperature variations, which also causes rust. Whenever rust is formed, it in turn can create back-coupling and reduce meter performance.

The oil and gas industry has safety regulations for hazardous and flammable zones, along with regulatory restrictions regarding metering accuracy. These rules require USM's to provide a signal that is robust and that has a good signal-to-noise ratio. In addition, USM's must meet certain sensitivity metrics in order to work in various environmental conditions. These standards are difficult to meet given the numerous disturbances that can be present. Rusted parts are not only a durability concern, but also induce back-coupling, which results in meter performance problems.

While rusting is a separate issue from back-coupling, they are actually interrelated problems, particularly in meter body and transducer performance. First, transducers need to be mounted inside the spool. The joint interface must be completely sealed and gas tight. Although a rubber gasket might work to seal out moisture and vapor and dust, such a seal requires an extremely tight fit. However, the tighter the joint interface gets, the more severe the unwanted back-coupling becomes. Thus, the use of traditional rubber gaskets is untenable for mounting USM transducers.

Accordingly, methods and systems for improved ultrasonic meter transducers are required as disclosed herein.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a gas distribution system solution.

It is another aspect of the disclosed embodiments to provide an improved ultrasonic meter.

It is another aspect of the disclosed embodiments to provide a method and system for improved transducers associated with ultrasonic meters.

It is yet another aspect of the disclosed embodiments to provide an enhanced mounting solution to prevent rust and back-coupling of ultrasonic meter transducers mounted on steel pipes.

The aforementioned aspects and other objectives and advantages can now be achieved as described herein. In embodiments disclosed herein, a system, method, and apparatus for attenuating acoustic back-coupling in a ultrasonic meter transducer that includes a gasket band comprising a loop of a material, a first gasket ring integrated in the gasket band configured to match a diameter of a first bracket hole, and a second gasket ring integrated in the gasket band configured to match a diameter of a second bracket hole wherein the loop of material comprises a material that provides both environmental sealing and acoustic attenuation.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
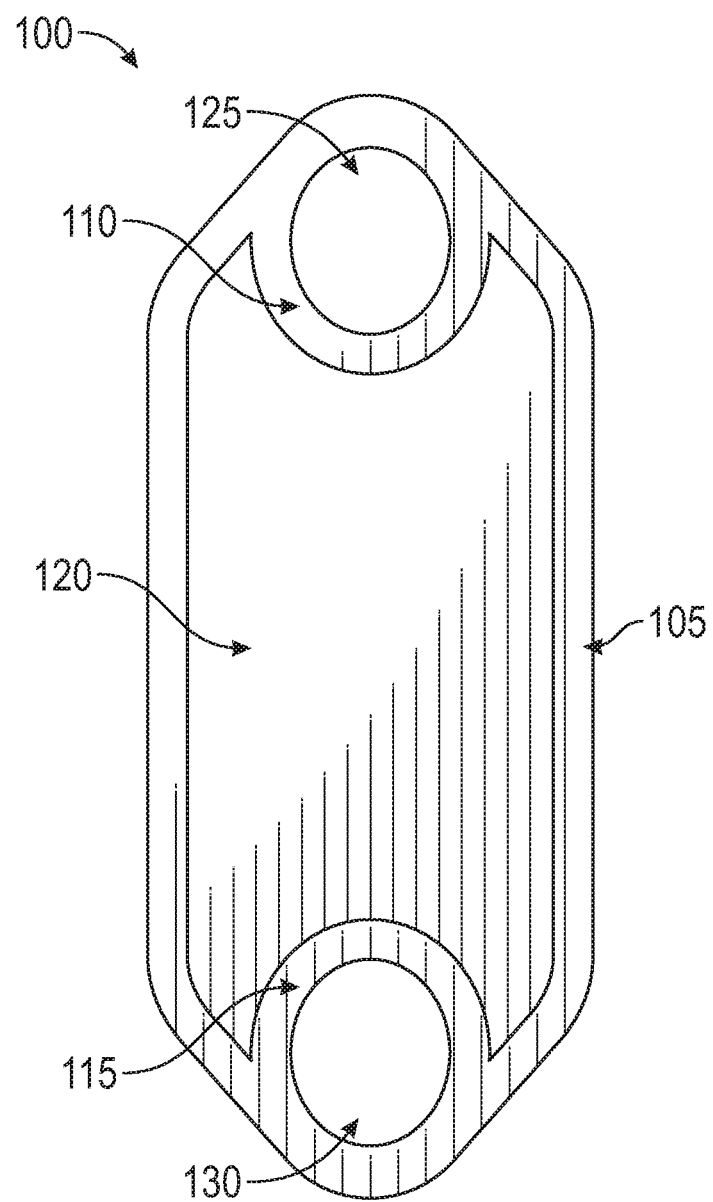
FIG. 1 depicts a gasket in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or" as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at leas part upon context, may be used to describe any feature, structure, or characteristic in a singular sense or may be used to describe combinations of features, structures, or characteristics in a plural sense. In addition, the term "based on" may be understood as not necessarily intended to convey an exclusive set of factors and may, instead, allow for existence of additional factors not necessarily expressly described, again, depending at least in part on context.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Back-coupling is a serious source of error and/or inaccuracy in ultrasonic metering. Back-coupling can obscure signal detection, deteriorate signal shape, decrease the signal-to-noise level, and reduce the measurement accuracy and overall meter performance. The methods and systems disclosed herein provide a solution. FIG. 1 illustrates a specialized gasket 100 that can be used to simultaneously address back-coupling and rust issues associated with ultrasonic meter transducer mounts.

The gasket 100 comprises a gasket band 105 that integrates a first gasket ring 110 and a second gasket ring 115. The gasket band forms a closed loop encircling voided region 120. Similarly, the first gasket ring is a closed loop that encircles voided region 125, and the second gasket ring is a closed loop that encircles voided region 130.

Figure 2:
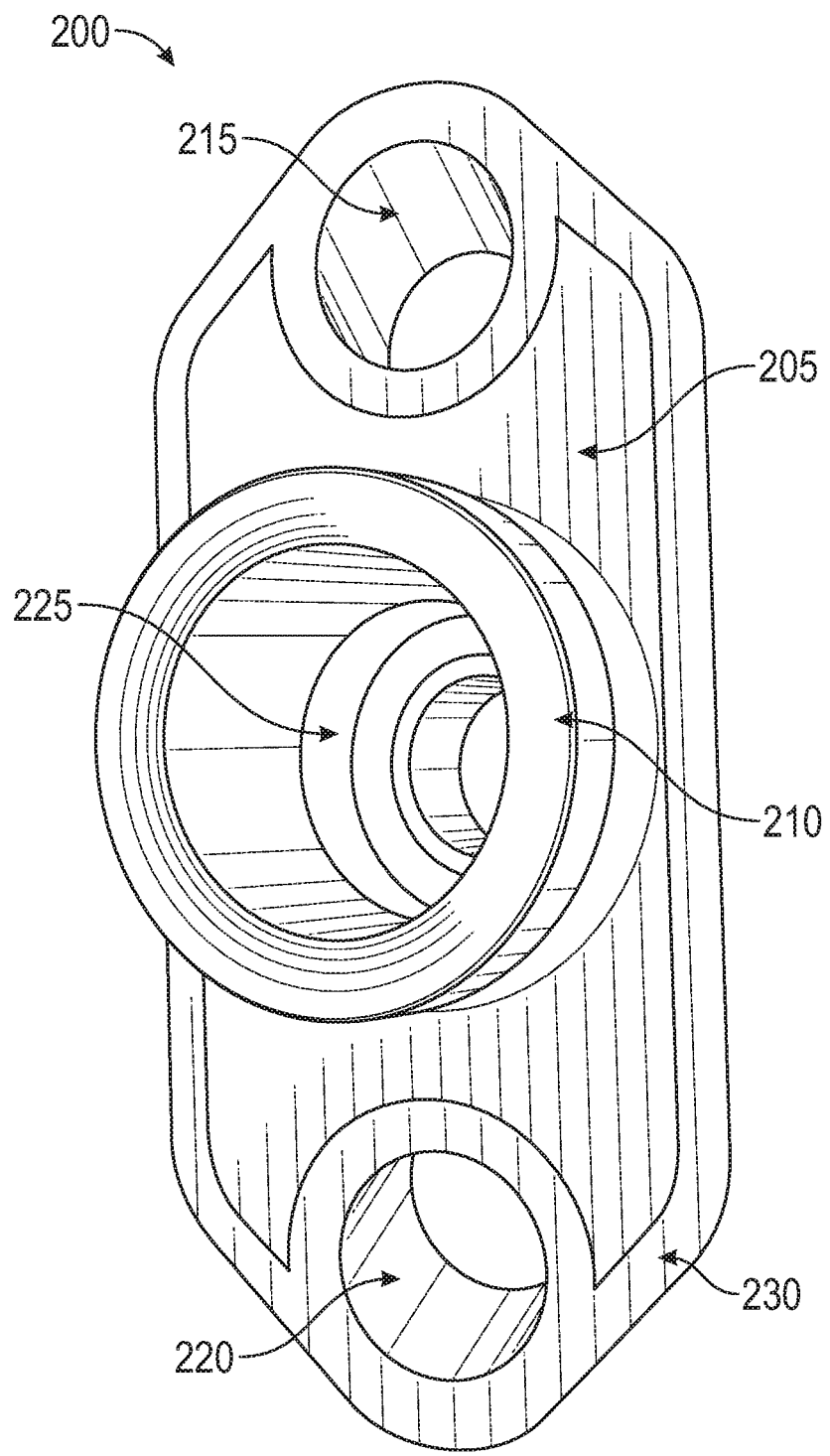
FIG. 2 depicts a mounting bracket in accordance with the disclosed embodiments.

The basic shape of gasket 100 is carefully selected to match the shape of a bracket 200 as illustrated in FIG. 2. Specifically, the bracket 200 generally comprises a bracket body 205. The bracket body 205 is most commonly configured of steel, but other materials may also be used. The bracket body 205 includes a mounting conduit 210, which provides a tube 225 that serves as the interface between the gas distribution infrastructure and an ultrasonic meter transducer. Mounting hole 215 and mounting hole 220 are provided to allow mounting hardware such as bolts, screws, pins, etc., to hold the mounting bracket to the gas distribution infrastructure.

In certain embodiments, the bracket body also has a recessed rim 230 that generally tracks the rim of the bracket body and the mounting holes 215 and 220. The recessed rim 230 is selected to have very specific dimensional characteristics that are selected to reduce back-coupling and prevent rust, as further discussed herein. In an embodiment, 40% of the thickness of gasket 100 protrudes above the surface of bracket body 205. This thickness is selected to fill the space between the meter body and mounting bracket 200. For example, in one embodiment, the depth of the recessed rim 230 is 1.5 mm, while thickness of gasket 100 is 2.5 mm, leaving the 1 mm of gasket to fill the space between the meter body and bracket 200 as required to ensure a proper fit for the gasket. In other embodiments, the gap between the mounting bracket 200 and meter body can vary from 0.5 mm to 5 mm. Further, the thickness of the gasket 100 can be varied with changes in the signal central wavelength. Therefore, the depth of the recessed rim 230 on the bracket 200 can be adjusted accordingly.

Figure 3:
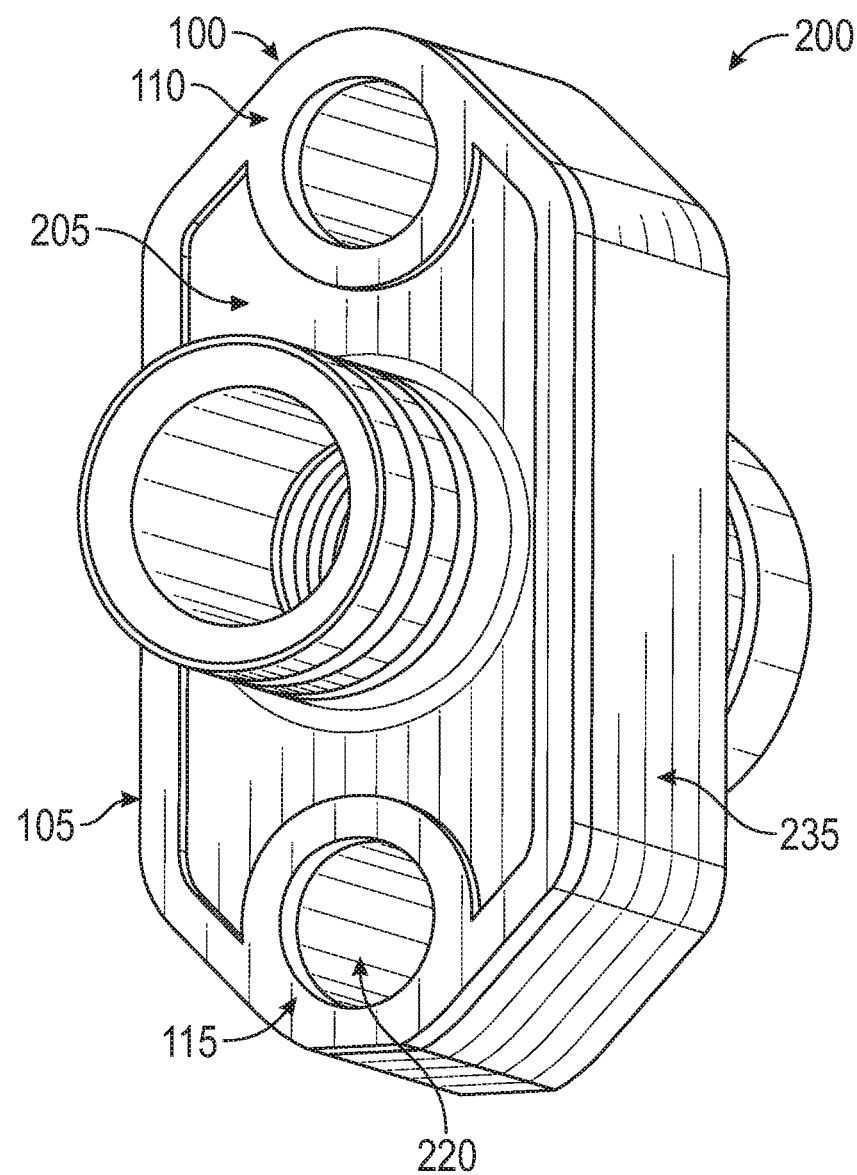
FIG. 3 depicts a mounting system in accordance with the disclosed embodiments.

FIG. 3 illustrates an embodiment, where the gasket 100 is installed on the bracket 200. The gasket band 105 tracks the outer rim of the bracket 200 and preferably sits in the recessed rim 230. In embodiments, where the bracket 200 does not include a recessed rim, the gasket band simply sits on the surface of the bracket 200. As illustrated in FIG. 3, the gasket band 205 is configured to be flush with the sidewalls 235 of the bracket body 205, such that the gasket band 205 does not overhang the sidewalls 235 of the bracket body. Likewise, the gasket rings 110 and 115 surround the rim of the mounting holes 215 and 220, without overlapping the mounting holes 215 and 220.

Rubber gaskets cannot be used in the embodiments disclosed herein because the tightness required for proper sealing results in increased back-coupling effects. Thus, in the embodiments disclosed herein, specific materials and dimensions are selected for gasket band 105 in order to provide the necessary environmental seal (and prevent rust), while reducing the effects of back-coupling.

In general, the rubber gasket can have a reasonably small sealing strip footprint that prevents possible water/vapor/dust ingress from outside to inside and/or possible if any leakage from inside to outside. In an embodiment, the width and thickness of the gasket band 105 are selected to be equal to (or as close as reasonably possible to) one half of the wavelength of the ultrasonic waves traveling inside the materials. These dimensions allow back-coupling signals to cancel each other via change of phase reversal in the vicinity of sealing, material. In such embodiments, back-coupling can be reduced before the effects render the signal overly noisy.

Although selecting specific dimensions of the gasket 100 will substantially reduce back-coupling, some residual back-coupling may remain even after cancellation, especially for wide-band signals. Remaining back-coupling can be further addressed by forming the gasket 100 of non-rubber materials that substantially attenuate ultrasounds. Materials that provide moderate density are good candidates to both provide adequate environmental seals under industrial conditions (to prevent rust) and also dampen ultrasonic back-coupling. The materials also preferably possess certain elasticity such as elastomer as well as low permeability but quick recovery, so that they can adapt themselves to the meter body change effect, which results from temperature variations. In certain embodiments, the gasket 100 can be formed of polyethylene, polyether urethane, NBR/PVC, Cross linked Polyethylene, and/or Neoprene Foam.

Figure 4A:
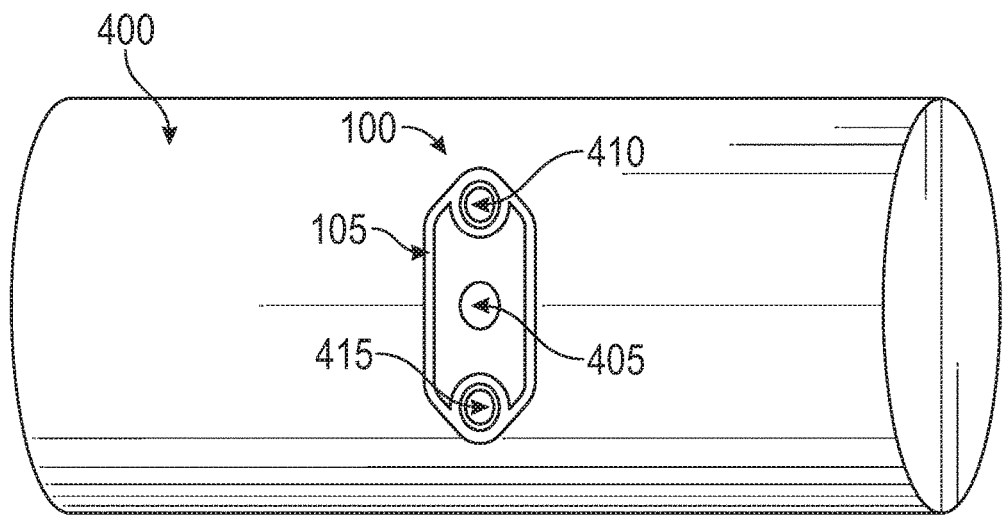
FIG. 4A depicts a gas distribution system in accordance with the disclosed embodiments.

FIG. 4A illustrates the gasket 100 in position on gas distribution infrastructure 400. Most commonly gas distribution infrastructure 400 comprises steel pipes used for transporting flowing materials from one place to another. In other embodiments, the gas distribution infrastructure can be configured of other materials.

The gas distribution infrastructure can also include mounting hole 410 and mounting hole 415. The void 125 in gasket band 105 allows a mounting device that passes through mounting hole 215 in bracket 200 to interface with mounting hole 410 in the gas distribution infrastructure 400. Similarly, the void 130 in gasket band 105 allows a mounting device that passes through mounting hole 220 in bracket 200 to interface with mounting hole 415 in the gas distribution infrastructure 400.

Figure 4B:
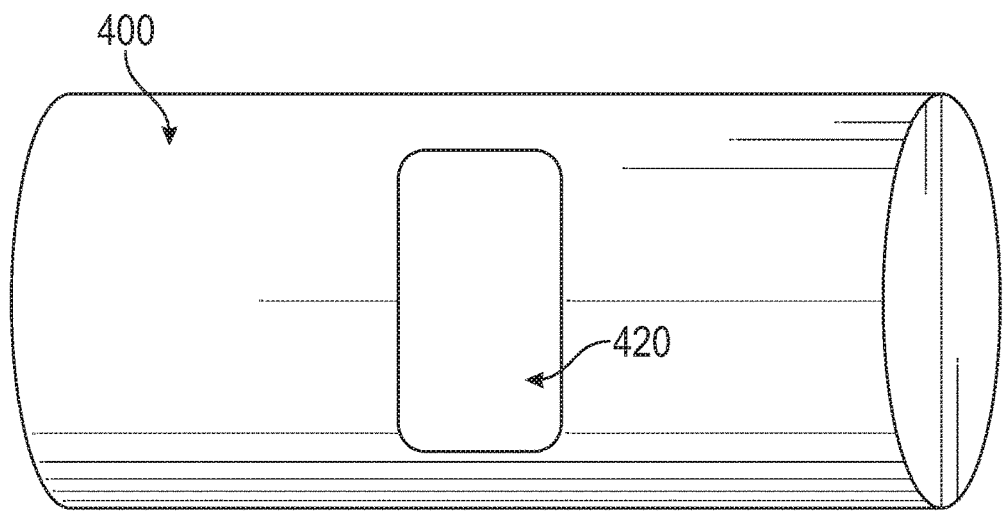
FIG. 4B depicts an ultrasonic meter transducer mounted to a gas distribution infrastructure in accordance with the disclosed embodiments.

FIG. 4B illustrates an ultrasonic transducer 420 mounted to the gas distribution infrastructure 400. It should be appreciated that the bracket 200 and gasket 100 are used to securely hold the ultrasonic transducer 420 on the gas distribution infrastructure 400, and provides a conduit through which the transducer can send signals to and receive signals from and/or through the interior of the gas distribution infrastructure.

Figure 5:
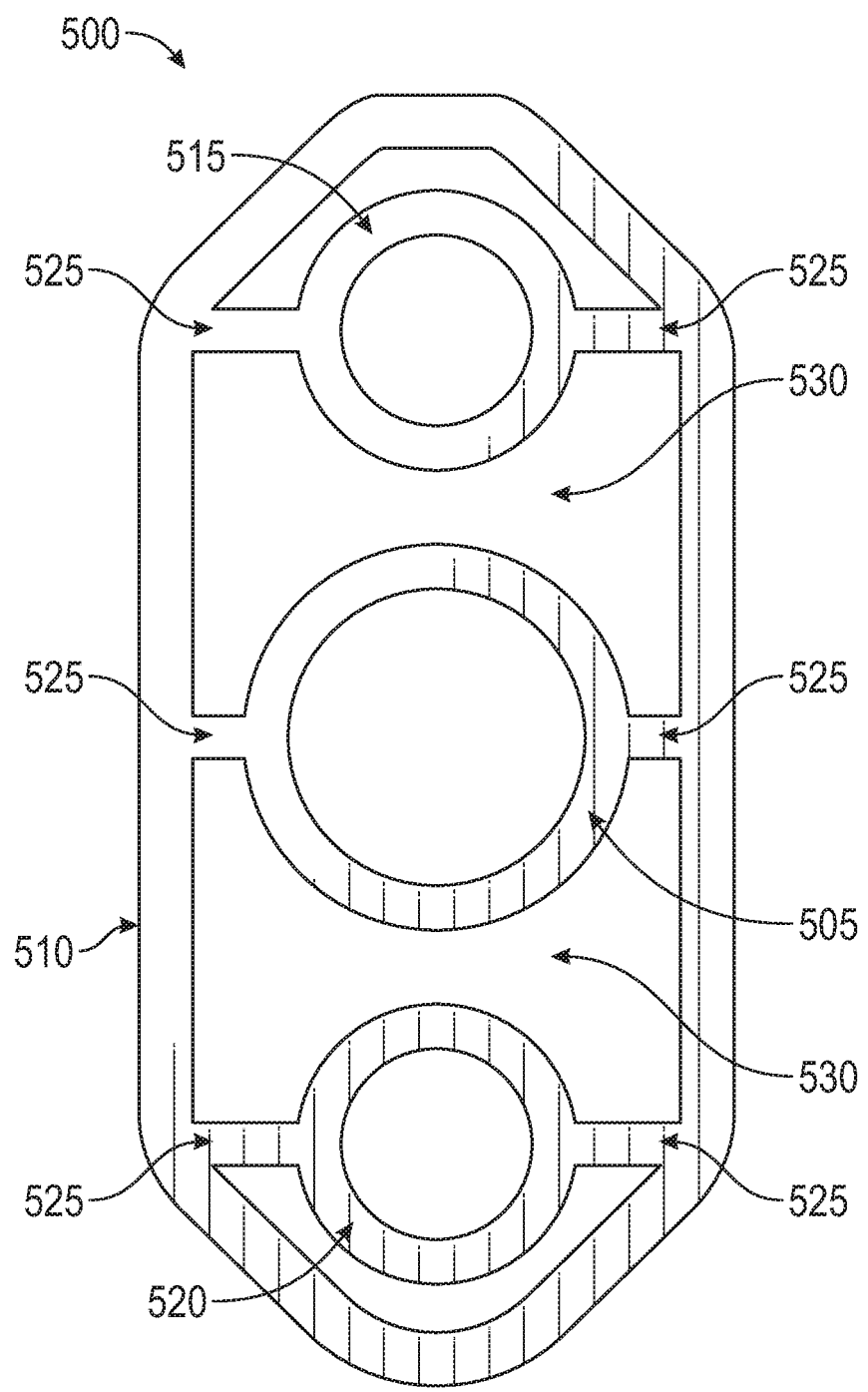
FIG. 5 depicts an alternative embodiment of a gasket in accordance with the disclosed embodiments.

FIG. 5 illustrates a gasket 500 in accordance with another embodiment. The gasket 500 differs from gasket 100 in that a third gasket ring 505 is provided to surround the mounting conduit. In addition, gasket 500 can provide a separation between the gasket band 510 and the first gasket ring 515, and between the gasket band 510 and the second gasket ring 520. Each of the first gasket ring 515, second gasket ring 520, and third gasket ring 505 can be held in place via one or more gasket arms 525. The gasket can encircle voided regions 530.

Figure 6:
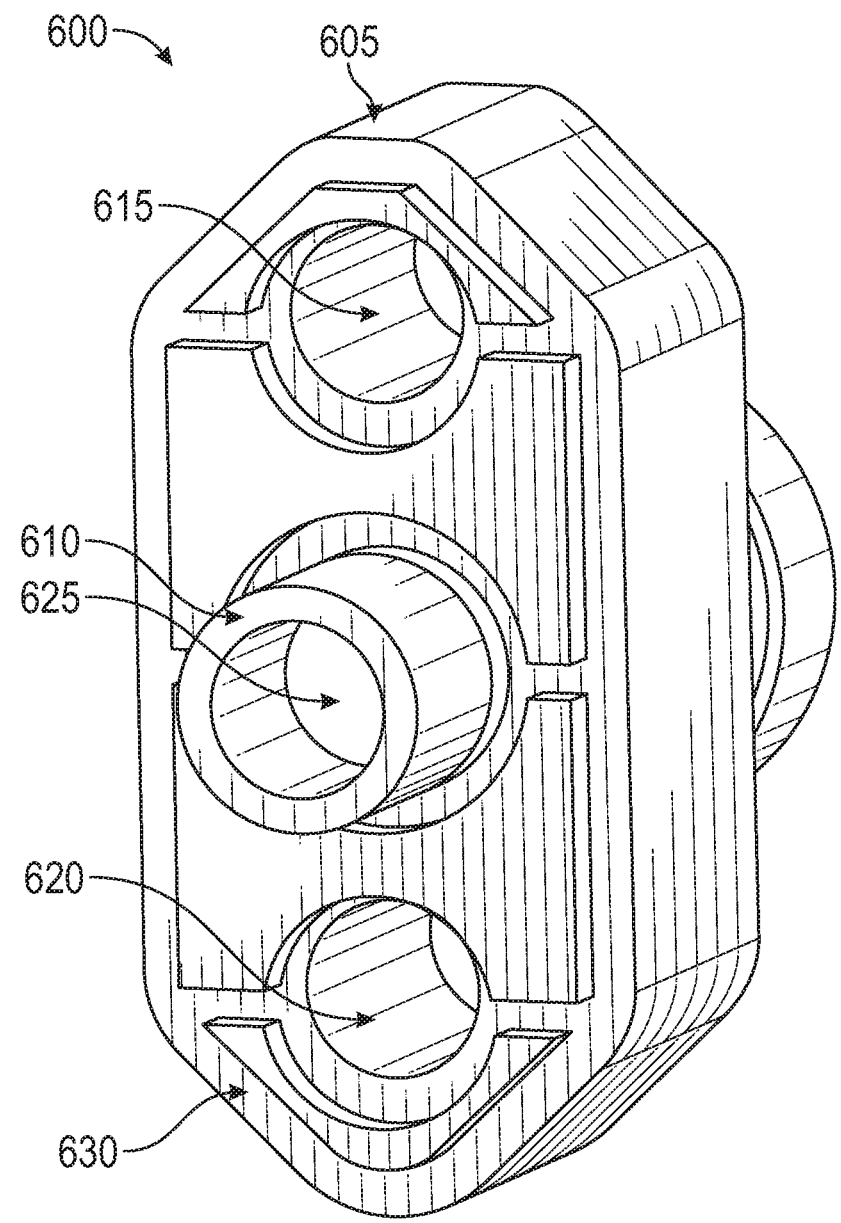
FIG. 6 depicts an alternative embodiment of a mounting bracket in accordance with the disclosed embodiments.

FIG. 6 illustrates a mounting bracket 600. The basic shape of gasket 500 is carefully selected to match the shape of bracket 600, as illustrated in FIG. 6. The bracket body 605 includes the mounting conduit 610, which provides a tube 625 that serves as the interface between the gas distribution infrastructure and an ultrasonic meter transducer. Mounting hole 615 and mounting hole 620 are provided to allow mounting hardware such as bolts, screws, pins, etc., to hold the mounting bracket to the gas distribution infrastructure. In certain embodiments, the bracket body 605 also has a recessed rim 630 that generally tracks the rim of the bracket body 605, the rim of the mounting conduit 610, the one or more gasket arms paths, and the mounting holes 615 and 620. The recessed rim 630 is configured to have very specific dimensional characteristics that are selected to reduce back-coupling and prevent rust.

Figure 7:
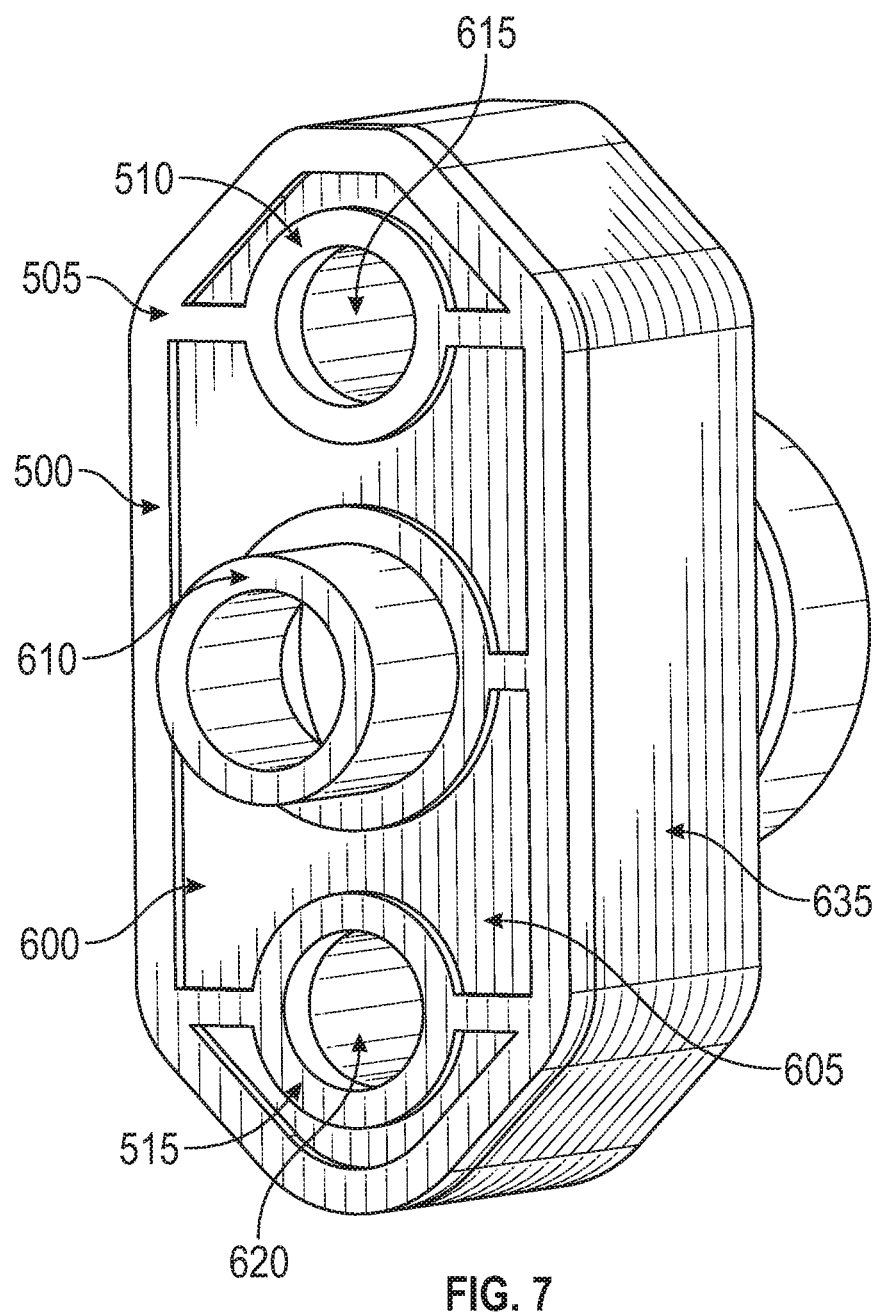
FIG. 7 depicts an alternative embodiment of a mounting system in accordance with the disclosed embodiments.

FIG. 7 illustrates an embodiment where the gasket 500 is installed on the bracket 600. The gasket band 505 tracks the outer rim of the bracket 600 and preferably sits in the recessed rim 630. In embodiments where the bracket 600 does not include a recessed rim, the gasket 500 simply sits on the surface of the bracket 600. As illustrated in FIG. 7, the gasket band 505 is configured to be flush with the sidewalls 635 of the bracket body 605, such that the gasket band 505 does not overhang the sidewalls 635 of the bracket body 605. Likewise, the gasket rings 510 and 515 surround the rim of the mounting holes 615 and 620, and the gasket ring 505 surrounds the mounting conduit 610, without overlapping.

In an embodiment, the width and thickness of the gasket 500 are selected to be equal to (or as close as reasonably possible to) one half of the wavelength of the ultrasonic waves traveling inside the materials. These dimensions allow back-coupling signals to cancel each other via change of phase reversal in the vicinity of sealing material. In such embodiments, back-coupling can be reduced before the effects render the signal overly noisy. In an embodiment, 40% of the thickness of the gasket 500 can protrude from the surface of bracket body 605. This allows the gasket 500 to fit properly between the meter body and mounting bracket 600. For example, in an embodiment, the depth of recessed rim 630 is 1.5 mm, while the thickness of gasket 500 is 2.5 mm. As such the gasket 500 fits in the 1 mm between the meter body and bracket 600.

Although selecting specific dimensions of the gasket 500 will substantially reduce back-coupling, some residual back-coupling may remain even after cancellation. Remaining back-coupling can be further addressed by forming the gasket 100 of non-rubber materials that substantially attenuate ultrasounds. In certain embodiments, the gasket 100 can be formed of one or more of these materials: polyethylene, polyether urethane, NBR/PVC Cross linked Polyethylene, and Neoprene Foam.

Figure 8:
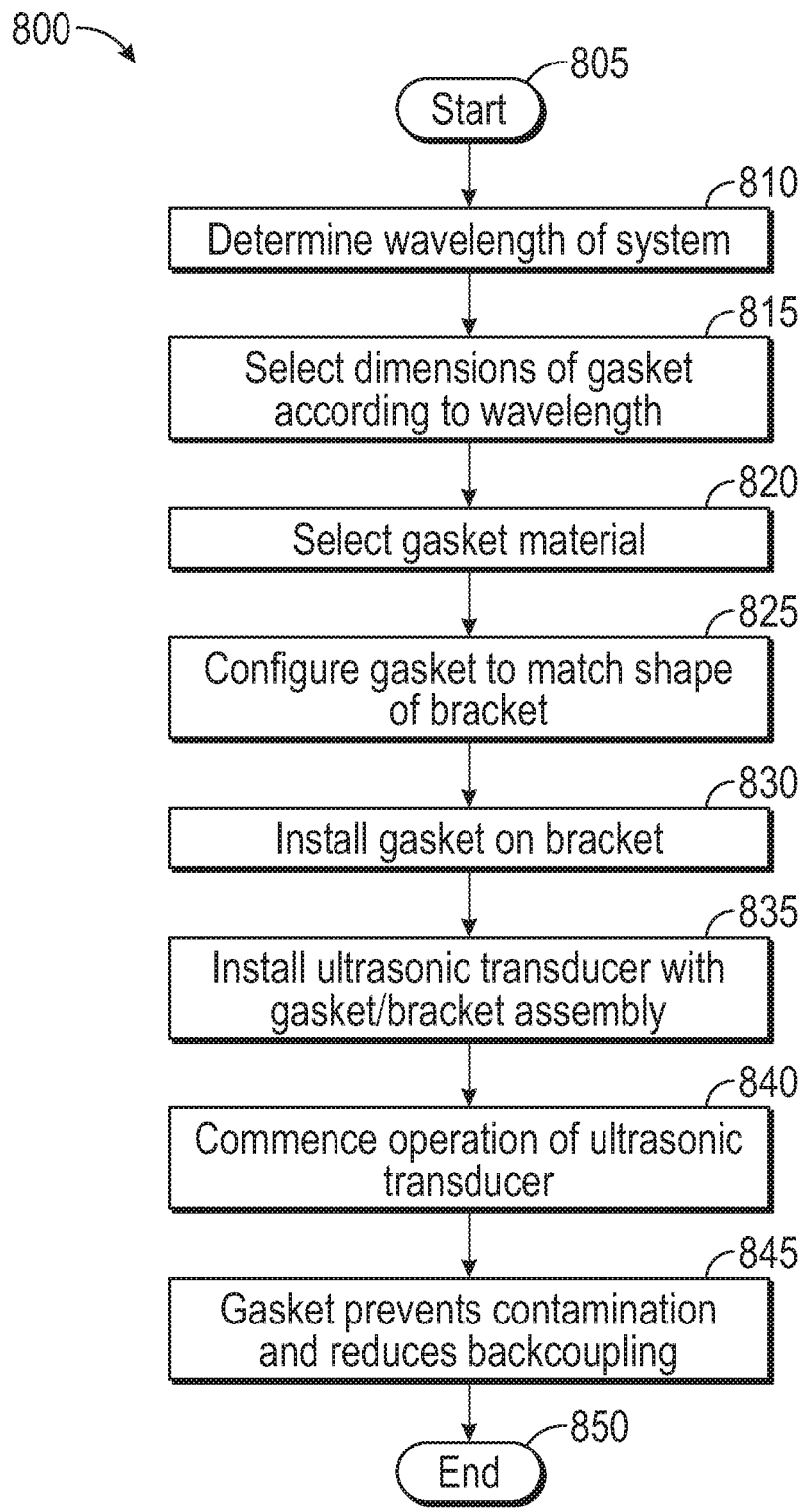
FIG. 8 depicts a flow chart illustrating steps in a method for improved ultrasonic meter transducer operation in accordance with the disclosed embodiments.

FIG. 8 provides a flow chart 800 of steps associated with a method for providing a seal while reducing back-coupling associated with an ultrasonic meter transducer mounted on a gas distribution infrastructure. The method begins at step 805.

At step 810, an effective central wavelength of the signal associated with an ultrasonic meter transducer can be determined. Next at step 815, the gasket material can be selected. The material is preferably a moderate material having certain elasticity like elastomer as well as low permeability but quick recovery that together with recessed rim will prevent moisture, vapor condensation and fine dust, dirt, and other contaminants from entering the gas distribution infrastructure, prevent rust, and attenuate back-coupling. In some embodiments, such materials include polyethylene, polyether urethane, NBR/PVC, Cross linked Polyethylene, and/or Neoprene Foam. In other embodiments, other materials can be used provided such materials provide the desired characteristics.

The effective central wavelength of the signal and gasket material selection can be used at step 820 to select the thickness and width of the gasket. In certain embodiments, the thickness and width of the gasket can be determined by dividing the wavelength of the ultrasonic meter by two while accounting for the material factor (i.e., the speed of sound which depends on the material properties and hence the wavelength). The gasket width and thickness can be selected to be a half of the wavelength associated with gasket materials and ultrasonic meter transducer. This dimensional characteristic is intended to result in self-cancellation of ultrasonic waves via phase reversal. The dimension of the gasket can also be determined by dividing the velocity of the ultrasonic signal in the gasket material by twice the frequency. In other embodiments, the thickness and width of the gasket can be selected according to other criteria that will reduce back-coupling.

At step 825, the determination of the wavelength at step 815 can also be used to establish the depth and width of the recess formed in a mounting bracket. In certain embodiments, the depth can be selected to be 60% of the thickness of the gasket, effectively leaving 40% of the gasket thickness extending above the bracket surface. The width of the recess can be selected to match the width of the gasket.

Next, at step 830, the gasket can be configured to match the shape of the mounting bracket. It should be appreciated that in embodiments where the mounting, bracket includes a recess, the shape, width, and thickness of the gasket is selected to 100% match the width of the recess in the bracket surrounding the rim of the bracket, 60% match to depth of the recessed rim, the mounting holes of the bracket, and potentially the mounting conduit of the bracket. This can include selecting a specified thickness of the bracket to exceed the depth of the recess by an amount (e.g., 40%) selected such that the installed bracket and gasket assembly does not overhang the sidewalls of the bracket when it is slightly squeezed between the bracket and the gas distribution infrastructure; the gasket properly fits in the space between in the bracket and gas distribution infrastructure.

It should be appreciated that the method illustrated herein is exemplary and that the order of steps can be modified in certain embodiments. For example, in some embodiments, the recessed rim can be formed before, during, or after the configuration of the gasket.

At step 835, the gasket can be fitted onto the bracket, and in appropriate cases, into the recess formed on the bracket. If no recess is provided, the gasket can simply sit on the surface of the bracket. The bracket and gasket assembly can then be connected to the gas distribution infrastructure such that the gasket fills the space between the meter body interface and mounting bracket and ultrasonic transducer at step 840, at which point, the operation of the ultrasonic transducer can commence at step 840. The specially formed gasket prevents contamination and rust, and reduces back-coupling as shown at 845. The method ends at step 850.

It should be appreciated that the anti-rust and anti-back-coupling solution disclosed in the embodiments herein is not limited to application in ultrasonic gas flow meters. In other embodiments, the methods and systems can also be applied to ultrasonic liquid flow meters. In other embodiments, the anti-backcoupling, in particular, can also be suitable for other ultrasonic imaging and diagnostics systems including medical applications and non-destructive test (NGT) equipment, etc. Because the signal to noise ratio is always the determining factor in system sensitivity and detectability, back-coupling reduces SNR by increasing noise and reducing the signal and/or corrupting the useful signals.

Based on the foregoing, it can be appreciated that a number of embodiments, preferred and alternative, are disclosed herein. For example, in one embodiment, an apparatus comprises a gasket band comprising a loop of a material, a first gasket ring integrated in the gasket band configured to match a diameter of a first bracket hole, and a second gasket ring integrated in the gasket band configured to match a diameter of a second bracket hole wherein the loop of material comprises a material that provides environmental sealing and acoustic attenuation. In an embodiment, the material comprises at least one of crosslinked polyethylene, polyether urethane, Neoprene, and polymer the polymer comprising (NBR/PVC).

In an embodiment, the apparatus further comprises a bracket wherein the gasket band is configured to match a shape of a rim of the gasket. The bracket comprises a mounting bracket for an ultrasonic meter transducer. In an embodiment, the bracket further comprises a recessed rim, the recessed rim being shaped to match a gasket band shape and a gasket band width, the first gasket ring shape, and the second gasket ring shape, wherein a prescribed portion of the gasket band, the first gasket ring, and the second gasket ring extend above a surface of the bracket by a prescribed dimension (e.g., 40% of the thickness of gasket). The rest of the portion of the gasket thickness fits between the meter body and bracket with slight compression, if any.

In an embodiment, at, least one of a thickness and a width of the gasket band, the first gasket ring, and the second gasket ring are selected according to a portion of a wavelength of the gasket material and an associated ultrasonic metering transducer.

In an embodiment, the apparatus further comprises a third gasket ring configured between the first gasket ring and the second gasket ring and at least one gasket arm connecting the third gasket ring to the gasket band.

In another embodiment, a system comprises a gasket band comprising a loop of a material, a bracket wherein the gasket band is configured to match a shape of a rim of the gasket, a first gasket ring integrated in the gasket band configured to match a diameter of a first bracket hole, and a second gasket ring integrated in the gasket band configured to match a diameter of a second bracket hole wherein the loop of material comprises a material that provides environmental sealing and acoustic attenuation. In an embodiment, the material comprises at least one of crosslinked polyethylene, polyether urethane, Neoprene, and polymer the polymer comprising (NBR/PVC).

In an embodiment, the system further comprises an ultrasonic meter wherein the bracket comprises a mounting bracket for an ultrasonic meter transducer. In an embodiment, the bracket further comprises a recessed rim, the recessed rim being shaped to match a gasket band shape and a gasket band width, the first gasket ring shape, and the second gasket ring shape, wherein a prescribed portion of the gasket band, the first gasket ring, and the second gasket ring extend above a surface of the bracket by a prescribed dimension. In an embodiment, at least one of a thickness and a width of the gasket band, the first gasket ring, and the second gasket ring are selected according to a portion of a wavelength of an associated ultrasonic metering transducer.

In an embodiment, the system further comprises a third gasket ring configured between the first gasket ring and the second gasket ring and at least one gasket arm connecting the third gasket ring to the gasket band.

In yet another embodiment, a back-coupling attenuation method comprises determining a wavelength associated with an ultrasonic meter transducer, configuring a gasket according to the wavelength of the ultrasonic meter transducer, selecting a material of the gasket according to the wavelength of the ultrasonic meter transducer, and connecting the ultrasonic meter transducer to a gas distribution device with a bracket, the gasket being formed between the bracket and the gas distribution thereby providing environmental sealing and acoustic attenuation. In an embodiment, the material of the gasket comprises at least one of crosslinked polyethylene, polyether urethane, Neoprene, and polymer the polymer comprising (NBR/PVC).

In an embodiment, the method further comprises configuring the gasket band to match a shape of a rim of the gasket configuring a first gasket ring integrated in the gasket band to match a diameter of a first bracket hole in the bracket, and configuring a second gasket ring integrated in the gasket band to match a diameter of a second bracket hole.

In an embodiment, the method further comprises forming a recessed rim, the recessed rim being shaped to match a gasket band shape and a gasket band width, the first gasket ring shape, and the second gasket ring shape, wherein a prescribed portion of the gasket band, the first gasket ring, and the second gasket ring extend above a surface of the bracket by a prescribed dimension.

In an embodiment, configuring the gasket according to the wavelength of the ultrasonic meter transducer further comprises configuring a thickness of the gasket band, the first gasket ring, and the second gasket ring according to a portion of the wavelength of the ultrasonic metering transducer.

In an embodiment, configuring the gasket according to the wavelength of the ultrasonic meter transducer further comprises configuring a width of the gasket band, the first gasket ring, and the second gasket ring according to a portion of the wavelength of the ultrasonic metering transducer.

In an embodiment, the method further comprises forming a third gasket ring configured between the first gasket ring and the second gasket ring and connecting the third gasket ring to the gasket band with at least one gasket arm with.

It will be appreciated that variations of the above-disclosed and other features and functions, or alternatives thereof, may be desirably combined into many other different systems or applications. Also, it will be appreciated that various presently unforeseen or unanticipated alternatives, modifications, variations or improvements therein may be subsequently made by those skilled in the art which are also intended to be encompassed by the following claims.

What is claimed is:

1. An apparatus comprising:
   a gasket band comprising a loop of a material;
   a bracket wherein said gasket band is configured to match a shape of a rim of said gasket;
   a first gasket ring integrated in said gasket band configured to match a diameter of a first bracket hole; and
   a second gasket ring integrated in said gasket band configured to match a diameter of a second bracket hole wherein said loop of material comprises a material that provides environmental sealing and acoustic attenuation,
   wherein said bracket comprises a mounting bracket for an ultrasonic meter transducer.

2. The apparatus of claim 1 wherein said material comprises at least one of:
   crosslinked polyethylene;
   polyether urethane;
   Neoprene; and
   polymer said polymer comprising (NBR/PVC).

3. The apparatus of claim 1 wherein said bracket further comprises:
   a recessed rim, said recessed rim being shaped to match a gasket band shape and a gasket band width, said first gasket ring shape, and said second gasket ring shape, wherein a prescribed portion of said gasket band, said first gasket ring, and said second gasket ring extend above a surface of said bracket by a prescribed dimension.

4. The apparatus of claim 1 wherein at least one of a thickness and a width of said gasket band, said first gasket ring, and said second gasket ring are selected according to a portion of a wavelength of said gasket material and an associated ultrasonic metering transducer.

5. The apparatus of claim 1 further comprising:
   a third gasket ring configured between said first gasket ring and said second gasket ring; and
   at least one gasket arm connecting said third gasket ring to said gasket band.

6. An system comprising:
   a gasket band comprising a loop of a material;
   a bracket wherein said gasket band is configured to match a shape of a rim of said gasket;
   a first gasket ring integrated in said gasket band configured to match a diameter of a first bracket hole; and
   a second gasket ring integrated in said gasket band configured to match a diameter of a second bracket hole wherein said loop of material comprises a material that provides environmental sealing and acoustic attenuation.

7. The system of claim 6 wherein said material comprises at least one of:
   crosslinked polyethylene;
   polyether urethane;
   Neoprene; and
   polymer said polymer comprising (NBR/PVC).

8. The system of claim 6 further comprising an ultrasonic meter wherein said bracket comprises a mounting bracket for an ultrasonic meter transducer.

9. The system of claim 6 wherein said bracket further comprises:
   a recessed rim, said recessed rim being shaped to match a gasket band shape and a gasket band width, said first gasket ring shape, and said second gasket ring shape, wherein a prescribed portion of said gasket band, said first gasket ring, and said second gasket ring extend above a surface of said bracket by a prescribed dimension.

10. The system of claim 6 wherein at least one of a thickness and a width of said gasket band, said first gasket ring, and said second gasket ring are selected according to a portion of a wavelength of an associated ultrasonic metering transducer.

11. The system of claim 6 further comprising:
    a third gasket ring configured between said first gasket ring and said second gasket ring; and
    at least one gasket arm connecting said third gasket ring to said gasket band.

12. A back-coupling attenuation method, said method comprising:
    determining a wavelength associated with an ultrasonic meter transducer;
    configuring a gasket according to said wavelength of said ultrasonic meter transducer;
    selecting a material of said gasket according to said wavelength of said ultrasonic meter transducer; and
    connecting said ultrasonic meter transducer to a gas distribution device with a bracket, said gasket being formed between said bracket and said gas distribution thereby providing environmental sealing and acoustic attenuation.

13. The method of claim 12 wherein said material of said gasket comprises at least one of:
    crosslinked polyethylene;
    polyether urethane;
    Neoprene; and
    polymer said polymer comprising (NBR/PVC).

14. The method of claim 12 further comprising:
    configuring said gasket band to match a shape of a rim of said gasket;
    configuring a first gasket ring integrated in said gasket band to match a diameter of a first bracket hole in said bracket; and configuring a second gasket ring integrated in said gasket band to match a diameter of a second bracket hole.

15. The method of claim 14 further comprising:
forming a recessed rim, said recessed rim being shaped to match a gasket band shape and a gasket band width, said first gasket ring shape, and said second gasket ring shape, wherein a prescribed portion of said gasket band, said first gasket ring, and said second gasket ring extend above a surface of said bracket by a prescribed dimension.

16. The method of claim 14 wherein configuring said gasket according to said wavelength of said ultrasonic meter transducer further comprises:
configuring a thickness of said gasket band, said first gasket ring, and said second gasket ring according to a portion of said wavelength of said ultrasonic metering transducer.

17. The method of claim 14 wherein configuring said gasket according to said wavelength of said ultrasonic meter transducer further comprises:
configuring a width of said gasket band, said first gasket ring, and said second gasket ring according to a portion of said wavelength of said ultrasonic metering transducer.

18. The method of claim 14 further comprising:
forming a third gasket ring configured between said first gasket ring and said second gasket ring; and
connecting said third gasket ring to said gasket band with at least one gasket arm with.

* * * * *